United States Patent
Panaccio

(10) Patent No.: US 8,933,632 B2
(45) Date of Patent: Jan. 13, 2015

(54) CONTROLLER

(76) Inventor: Luigi Panaccio, West Glamorgan (GB)

( * ) Notice: Subject to any disclaimer, the term of this patent is extended or adjusted under 35 U.S.C. 154(b) by 23 days.

(21) Appl. No.: 13/589,168

(22) Filed: Aug. 19, 2012

(65) Prior Publication Data

US 2013/0002143 A1    Jan. 3, 2013

(30) Foreign Application Priority Data

Feb. 18, 2010 (GB) .................................. 1002815.7
Mar. 18, 2010 (GB) .................................. 1004494.9
Feb. 18, 2011 (WO) ................. PCT/GB2011/050322

(51) Int. Cl.
H05B 37/02 (2006.01)
H05B 33/08 (2006.01)

(52) U.S. Cl.
CPC ........ *H05B 33/0854* (2013.01); *H05B 33/0851* (2013.01); *Y02B 20/348* (2013.01)
USPC .......................................... 315/152; 315/201

(58) Field of Classification Search
CPC ............... H05B 37/02; H05B 37/0209; H05B 37/0218; H05B 37/0281
USPC .................. 315/152, 297, 201, 228, 250, 307
See application file for complete search history.

(56) References Cited

U.S. PATENT DOCUMENTS

| | | | |
|---|---|---|---|
| 4,281,448 A * | 8/1981 | Barry et al. .................... | 438/418 |
| 6,078,148 A | 6/2000 | Hochstein | |
| 6,323,598 B1 * | 11/2001 | Guthrie et al. ............ | 315/200 A |
| 6,388,399 B1 | 5/2002 | Eckel et al. | |
| 7,872,430 B2 * | 1/2011 | Roberts et al. ................ | 315/307 |
| 2008/0224636 A1 * | 9/2008 | Melanson ..................... | 315/307 |
| 2009/0021185 A1 | 1/2009 | Ng | |
| 2009/0267540 A1 | 10/2009 | Chemel et al. | |
| 2010/0264832 A1 | 10/2010 | Archenhold et al. | |
| 2011/0115399 A1 * | 5/2011 | Sadwick et al. .............. | 315/287 |

OTHER PUBLICATIONS

International Search Report to PCT/GB2011/050322, issued Aug. 25, 2011.

* cited by examiner

*Primary Examiner* — Daniel D Chang
(74) *Attorney, Agent, or Firm* — Michael J. Feigin, Esq.; Feigin & Associates, LLC

(57) ABSTRACT

A controller is disclosed for controlling the optical output of at least one light emitting diode. The controller comprises a control unit and a power supply unit for supplying power to the at least one light emitting diode. The control unit is arranged to receive as input, first and second signals which are representative of the operating characteristics of the at least one light emitting diode, and which is further arranged to control the power output from the power supply unit to the at least one light emitting diode in dependence of the first and second signals. The first signal is representative of the current within the at least one light emitting diode and the second signal is representative of the temperature of the at least one light emitting diode so that the optical output from the at least one LED can be varied in accordance with the operating characteristics of the at least one light emitting diode.

17 Claims, 1 Drawing Sheet

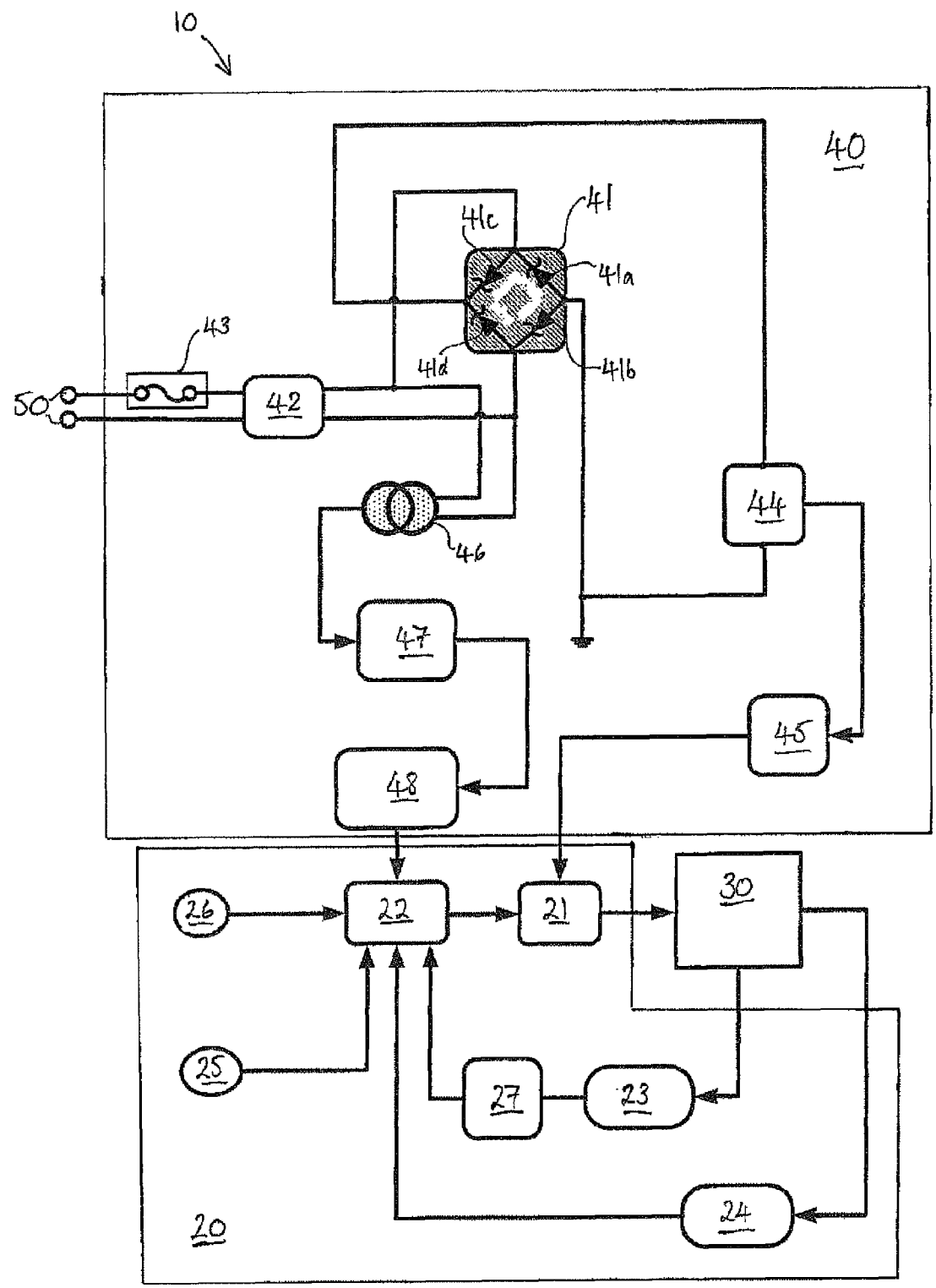

CONTROLLER

FIELD OF THE DISCLOSED TECHNOLOGY

The present invention relates to a controller and particularly, but not exclusively to a controller for controlling the optical output of at least one light emitting diode.

BACKGROUND

The optical output from an LED will vary over its useful lifetime and as such the perception of the light output will also vary.

DETAILED DESCRIPTION OF EMBODIMENTS OF THE DISCLOSED TECHNOLOGY

We have now devised a controller for controlling the optical output of at least one light emitting diode.

In accordance with the present invention as seen from a first aspect, there is provided a controller for controlling the optical output of at least one light emitting diode, the controller comprising a control unit and a power supply unit for supplying power to the at least one light emitting diode, the control unit being arranged to receive as input, first and second signals which are representative of the operating characteristics of the at least one light emitting diode, and which is further arranged to control the power output from the power supply unit to the at least one light emitting diode in dependence of the first and second signals, wherein the first signal is representative of the current within the at least one light emitting diode and the second signal is representative of the temperature of the at least one light emitting diode.

The provision of two feedback loops enables the control unit to monitor and adjust the optical output of the light emitting diode and to provide for an energy saving lighting system, without compromising the visual perception of the optical output.

Preferably, the control unit further receives as input a third signal which is representative of the time and a fourth signal which is representative of ambient lighting conditions.

The third signal is preferably generated by a clock which is arranged to monitor the time, such as the time of day and/or month and/or year, for example. The fourth signal is preferably generated by a sensor which senses ambient lighting conditions.

The controller is preferably arranged to control the optical output of a plurality of light emitting diodes.

The controller is preferably powered by an alternating current mains supply. The power unit preferably receives as input a rectified direct current supply which is obtained from the alternating current mains supply.

The power supply to the controller and the power unit is preferably first regulated to minimise any voltage spikes.

In accordance with the present invention as seen from a second aspect, there is provided an energy saver light emitting diode (LED) power supply system composed and realized as shown in the description with the elements represented in the drawing with the exposed automatic controls and features, comprising:
an overvoltage suppression section to cut the voltage transient peaks of the AC grid; a Graetz Schottky diode bridge for the efficient high voltage AC\DC conversion; a ripple filter to obtain a stable DC voltage; an high efficiency resonant DC/DC buck converter for an efficient DC\ DC conversion; a power unit that regulates efficiently voltage and current on the LED module; a control unit to manage automatically the other sections and to performs protection and energy saving operations; a LED module to convert efficiently the electrical energy supplied by the power unit into light energy.

In accordance with the present invention as seen from a third aspect, there is provided a method of controlling the optical output of at least one light emitting diode, the method comprising the steps of:
providing electrical power to the at least one light emitting diode to cause the light emitting diode to produce an optical output;
generating a first signal which is representative of the current passing through the at least one light emitting diode;
generating a second signal which is representative of the temperature of the at least one light emitting diode;
adjusting the electrical power supply to the at least one light emitting diode in dependence of the first and second signals.

In accordance with the present invention as seen from a fourth aspect, there is provided a lighting system comprising an array of light emitting diodes and at least one controller of the first or second aspect.

An embodiment of the present invention will now be described by way of example only and with reference to the accompanying drawing, which illustrates an electronic circuit comprising a controller according to the described embodiment of the present invention.

Referring to the drawing, there is illustrated an electronic circuit 10 comprising a controller 20 for controlling the optical output of an array of light emitting diodes (LED) (not shown) housed within an LED module 30. The LED's are powered using a power unit 21 which receives as input a control signal from a control unit 22 and a power supply from a power modulation system 40.

The power modulation system 40 comprises a Graetz diode bridge 41 which receives an alternating current input from the mains 50, for example. The ac supply to the diode bridge 41 however, is first passed through a voltage suppression circuit 42 which is arranged to remove any voltage spikes which appear from the mains 42 above a threshold value, and a fuse 43, such as a self restoring fuse, which is arranged to isolate the power modulation system 40 from the mains 50 in the event that the mains input voltage far exceeds the average voltage.

The diode bridge 41 comprises four Schottky diodes 41a-d which are arranged to minimize the voltage drop across the diode bridge 41, and thus minimize electrical power dissipation in the diode bridge 41.

The diode bridge 41 is arranged to generate a rectified voltage which is subsequently passed through a ripple filter 44 comprising a capacitor and resistor (not shown) arranged in a parallel configuration. The capacitors (not shown) of the filter 44 comprise a low equivalent series resistance (ESR) to withstand any peaks in the current, and comprise a working temperature range which ensures a long filter lifetime. The ripple filter 44 is arranged to smooth the oscillating waveform from the diode bridge 41 and generate a substantially constant voltage, which is subsequently passed to a buck converter 45.

The buck converter is arranged to step-down the direct current voltage supply from the filter 44 to a useful voltage for powering the power unit 21 of the controller 20. The buck converter 45 regulates the output voltage to the power unit 21 to produce a stable, constant voltage, and incorporates over-current protection, short-circuit protection and over-voltage protection circuitry to protect the power unit 21 from spurious voltages from the mains supply 50.

The power unit 21 is arranged to power the LED's of the LED module 30. The power unit 21 is arranged to generate a low frequency pulse width modulation of the voltage output from the resonant converter 45, to modulate the energy to transfer to the LED module 30. In order to minimise winding power losses associated with the converter 45, the converter 45 operates without the mean value inductor-capacitor (L-C) filter (not shown), which is commonly used in buck converters, without affecting LED lifetime. This is because the LED's (not shown) of the module 30 are capable of withstanding the peak forward current surges.

The mean value of the voltage across the LED module 30 can be expressed as:

$$V_M = \frac{1}{T}\int_0^T V(t)\,dt$$

where V(t) is the impulse signal with variable duty cycle and with peak value equal to the output voltage of the buck converter 45.

The voltage output from the power unit 21 is controlled by a switch (not shown), such as a metal oxide semiconductor field effect transistor (MOSFET), which comprises a low drain-source resistance when arranged in the ON state. The switching frequency of the MOSFET (not shown) must be a maximum of 3-4 kHz to ensure a high efficiency and to reduce any voltage stresses on the LED's (not shown) of the module 30.

The power modulation system 40 is also arranged to power the control unit 22. The output from the fuse 43 and the voltage suppression circuit 42 is passed through a current transformer 46 and then rectified and filtered using circuit 47 to produce a substantially stable uniform voltage. The output from the circuit 47 is subsequently passed to a voltage regulator 48 which further stabilizes the voltage supply to the control unit 22, such that the control unit 22 can maintain control of the entire electronic circuit 10 and perform operations such as modifying the power supply to the buck converter 45 and disabling a power factor correction of the buck converter 45 to increase conversion efficiency at low output current.

The control unit 22 comprises a microprocessor (not shown), or any other kind of programmable integrated circuit such as a field programmable gate array (FPGA), which is capable of controlling the power unit 21 in generating a pulse width modulated (PWM) signal. In this way the amount of power transferred to the LED module 30 is proportional to the duty cycle (D) of the PWM signal generated by the power unit 21. Upon increasing the duty cycle, more power will be delivered to the LED's (not shown) within the module 30 per voltage period.

When the mean value of the output current is equal to the nominal value of LED module 30 operating output current, the condition D<1, must be satisfied. This is because the human eye is more sensitive to the peak of light intensity than the mean value, while power consumption is proportional to the mean value of the current absorbed. In this way, it is possible to obtain a better visual perception using less electrical power.

The control unit 22 is arranged to set the duty cycle value following a control algorithm which has input values relating to the current within the LED's (not shown) of the module 30 as determined by a current sensor 23, the temperature of the LED's (not shown) as determined by a temperature sensor 24, ambient light intensity as determined by a light sensor 25, and a time signal, such as the time of day and/or time of year, as generated by a clock 26.

The signal from the current sensor 23 is necessary for regulating the current flow within the LED's (not shown) and for short-circuit protection of the power unit 21. The current signal from the LED module 30, is further passed through a low pass filter 27 to generate an average current signal which is passed to the control unit 22. Accordingly, when the mean value of the current flowing in the LED module 30 deviates outside a pre-defined range, the control unit 22 is arranged to adjust the duty cycle applied to the power unit 21 to vary the "ON" time during the voltage period and thus vary the current which is output therefrom.

When the mean value of the current flowing in the LED module 30 exceeds a maximum permitted current value for example, the control unit 22 is arranged to generate a signal which causes the power unit 21 to switch to the OFF state. The current sensor 23 is of an electromagnetic inductive type to reduce losses associated with sensors comprising amperometric resistive shunts, thereby increasing the efficiency at which electrical power is converted to optical output from the LED's (not shown). The current sensor 23 may comprise a transducer (not shown) comprising a wire winding formed on a ferromagnetic ring (not shown), which must be crossed by one of the two wires (not shown) of the LED module 30.

The temperature sensor 24 which monitors the temperature of the LED's (not shown), is mounted on a circuit board (not shown) of the LED module 30 and is arranged to generate a signal to the control unit 22 which is representative of the temperature of the circuit board (not shown), and thus the LED's (not shown). When the temperature of the LED module 30 deviates outside a pre-defined range, for example above 60° C., the control unit 22 decreases the duty cycle of the signal which is applied to the power unit 21 in proportion to the deviation in the temperature of the LED's outside the pre-defined range, to vary the mean value of the current which is output from the power unit 21, and thus the temperature of the LED module 30. This kind of temperature control is required to extend LED lifetime and to make the LED's (not shown) operate near the point of maximum device efficiency. This is because LED luminous efficiency is inversely proportional to the temperature of the LED, and so by keeping this temperature as low as possible, the LED efficiency can be held at its maximum value.

When the temperature of the LED module 30 exceeds the maximum operating temperature of the LED employed, the control unit 22 is arranged to generate a signal causing the power unit 21 to switch OFF the power supply to the module 30, and thus protect the LED's (not shown).

The light sensor signal is required when, for example, there is a need to lower the output light intensity of the LED module 30, thereby saving an additional amount of energy. The output from the light sensor 25 may be sensitive to an external command, such as a remote control signal or a signal from a resistive potentiometer or a trimmer (not shown), for example. The signal from the light sensor 25 may be a binary serial signal or an analogue signal which is sampled by the control unit 22. The signal from the light sensor 25 comprises information relating to the variation in duty cycle of the PWM signal which is required to realise the reduction in electrical power supply to the module 30.

The real time clock 26 is arranged to monitor the current time and is arranged to deliver time and day information to the control unit 22, so as to affect the light output in accordance with the time of day for example. The clock 26 is powered by a battery (not shown) and generates a serial signal with an interface protocol which is recognized by the control unit 22, such that the control unit 22 can provide for a gradual or stepped change in output light intensity.

The LED's (not shown) within the LED module 30 are arranged in an electrical parallel arrangement of rows of LED's (not shown), with the LED's (not shown) of each row being arranged in an electrical series configuration. The number of LED's (not shown) in series in each row must be more than ten, to reduce power losses due to electrical Ohmic conduction and to improve the efficiency of the buck converter 45. This is because the converter 45 provides an increased efficiency when the output voltage is higher and the output current is lower.

The LED module 30 comprises a further row comprising a series arrangement of a resistor (not shown) and a Zener diode (not shown). The row comprising the resistor (not shown) and the Zener diode (not shown) is arranged in parallel to the rows of LED's (not shown) and must be connected such that the cathode of the Zener diode (not shown) is coupled to the anode of the LED (not shown). This scheme is helpful as a passive over-voltage LED protection circuit, but is essential, when one or more LED's of a series is interrupted or defectively soldered, for example.

BRIEF DESCRIPTION OF THE DRAWINGS

FIG. 1 shows a high level block diagram of a device of an embodiment of the disclosed technology.

The invention claimed is:
1. An energy saver light emitting diode (LED) power supply system, comprising:
an overvoltage suppression section to cut the voltage transient peaks of the AC grid; a Graetz Schottky diode bridge for the efficient high voltage AC/DC conversion; a ripple filter to obtain a stable DC voltage; an high efficiency resonant DC/DC buck converter for an efficient DC/DC conversion; a power unit that regulates efficiently voltage and current on the LED module; a control unit to performing protection and energy saving operations; a LED module to convert efficiently the electrical energy supplied by the power unit into light energy;
wherein the ripple filter is build with capacitors with low equivalent series resistance and extended temperature range to ensure stability and long lifetime to the whole system.
2. The LED power supply system of the claim 1, wherein the overvoltage suppressor for the deletion of spikes and overvoltages is positioned at the first stage of the power supply and is linked to a fuse or with a self-restoring fuse.
3. The LED power supply system of the claim 1, wherein the Graetz schottky diode bridge is linked to the overvoltage suppressor and to the ripple filter to obtain an highly efficient rectification of the AC line.
4. The LED power supply system of the claim 1, wherein the high efficiency resonant direct current/direct current (DC/DC) buck converter transforms the rectified DC high voltage into a lower DC regulated voltage with extremely high efficiency and with overcurrent protection, short-circuit protection and overvoltage protection.
5. The LED power supply system of the claim 1, wherein the Power unit modulates the output voltage of the resonant converter with a low frequency Pulse Width Modulation, to vary the energy to transfer to LED module without any LC filter to eliminate winding power losses.
6. The LED power supply system of the claim 1, wherein the Power unit includes as power switch a Trench Mosfet, to reduce power losses in an ON state of this device.
7. The LED power supply system of the claim 1, wherein the Power unit includes capacitors with low ESR and extended temperature range to ensure stability and long lifetime to the whole system.
8. The LED power supply system of the claim 1, wherein the control unit includes a programmable integrated circuit able to generate a signal in pulse width modulation to control the amount of power transferred to the LED module following a control algorithm that involves all the input signals exposed in the previous description.
9. The LED power supply system of the claim 1, wherein the control unit generates a PWM signal with a variable duty cycle D that respects always the condition D<1, to obtain a reduction of power consumption because of the inertial features of human eye that is more sensitive to the peak of light intensity than its mean value, while power consumption is proportional to the mean value of the current absorbed.
10. The LED power supply system of the claim 1, further comprising a current transducer producing a signal for current regulation and short-circuit protection, the current transducer made of electromagnetic inductive material with a winding on a ferromagnetic ring to cut power losses due to amperometric resistive shunts.
11. The LED power supply system of the claim 1, further comprising an LED temperature transducer mounted on the circuit board of the LED module to transfer to the control unit the correct value of board temperature that has to be regulated.
12. The LED power supply system of the claim 1, further comprising a dimmer signal operable to reduce, manually or by remote control, the output light of the LED module saving an additional amount of energy.
13. The LED power supply system of the claim 1, further comprising a Real time clock keeping track of the current time, and delivering to the control unit time and day information, to decrease output light flow at a specific day or at a specific hour of a day reducing power consumption.
14. The LED power supply system of the claim 1, wherein the LED module is composed by the parallel of various series of more than ten LED's, to reduce power losses due to electrical ohmic conduction and to improve efficiency of the resonant converter, for the reason that at the same output power its efficiency is higher when the output voltage is higher and the output current is lower.
15. The LED power supply system of the claim 1, wherein the LED module has a series composed by a resistor and a Zener diode in parallel to each LED with the cathode of the Zener diode linked to the anode of the LED, to protect every single LED to over-voltages and to avoid the power off of the other LED's of the series when one or more LED's are interrupted or badly soldered.
16. An energy server light emitting diode (LED) power supply system composed and realized as shown in the previous description with the elements represented in the drawing with the exposed automatic controls and features, comprising:
an overvoltage suppression section to cut the voltage transient peaks of the AC grid; a Graetz Schottky diode bridge for the efficient high voltage AC\DC conversion; a ripple filter to obtain a stable DC voltage; an high efficiency resonant DC\DC buck converter for an efficient DC\DC conversion; a power unit that regulates efficiently voltage and current on the LED module; a control unit performing protection and energy saving operations; a LED module to convert efficiently the electrical energy supplied by the power unit into light energy;

wherein the control unit has a separate low current transformer with its own rectifier, filter and stabilized voltage regulator, to avoid unstable behaviour at the power on that can damage LED's with current peaks and to allow the control unit to keep the control of the whole system in every condition, to perform turning off of the power stage of the resonant converter in standby mode and to disable the power factor correction of the resonant converter at low output current, to increase conversion efficiency.

17. An energy saver light emitting diode (LED) power supply system composed and realized as shown in the previous description with the elements represented in the drawing with the exposed automatic controls and features, comprising:

an overvoltage suppression section to cut the voltage transient peaks of the AC grid; a Graetz Schottky diode bridge for the efficient high voltage AC\DC conversion; a ripple filter to obtain a stable DC voltage; an high efficiency resonant DC\DC buck converter for an efficient DC\DC conversion; a power unit that regulates efficiently voltage and current on the LED module; a control unit to manage automatically performing protection and energy saving operations; a LED module to convert efficiently the electrical energy supplied by the power unit into light energy;

wherein the control unit, to protect and extend LED lifetime and also to make LED's operate near the point of maximum device efficiency, proportionally to the surplus of temperature, decreases duty cycle applied to the power unit to decrease the mean value of output current and consequently to reduce LED temperature when the temperature of the LED module exceeds a limit value and to turn off the LED module when its temperature exceeds the maximum operating temperature of the LED employed.

* * * * *